(12) United States Patent
Hida

(10) Patent No.: US 8,779,324 B2
(45) Date of Patent: Jul. 15, 2014

(54) WELDING-LINE SELECTING METHOD

(75) Inventor: Masatoshi Hida, Kobe (JP)

(73) Assignee: Kobe Steel, Ltd., Kobe-shi, Hyogo (JP)

( * ) Notice: Subject to any disclaimer, the term of this patent is extended or adjusted under 35 U.S.C. 154(b) by 476 days.

(21) Appl. No.: 13/138,411

(22) PCT Filed: Feb. 12, 2010

(86) PCT No.: PCT/JP2010/052088
§ 371 (c)(1),
(2), (4) Date: Aug. 11, 2011

(87) PCT Pub. No.: WO2010/093018
PCT Pub. Date: Aug. 19, 2010

(65) Prior Publication Data
US 2012/0029674 A1    Feb. 2, 2012

(30) Foreign Application Priority Data

Feb. 13, 2009   (JP) .................................. 2009-031216

(51) Int. Cl.
| | | |
|---|---|---|
| B23K 10/00 | (2006.01) | |
| G06F 17/50 | (2006.01) | |
| B23K 9/127 | (2006.01) | |
| G05B 19/4097 | (2006.01) | |

(52) U.S. Cl.
CPC .. G05B 19/4097 (2013.01); G05B 2219/49386 (2013.01); G05B 2219/45104 (2013.01); G06F 2217/41 (2013.01); G06F 17/5009 (2013.01); G05B 2219/35102 (2013.01); B23K 9/127 (2013.01)
USPC .............. 219/121.54; 219/121.46; 219/124.1; 219/137 R; 219/121.59

(58) Field of Classification Search
CPC ........................................................ H05H 1/26
USPC ............. 219/121.45, 121.46, 121.59, 130.21, 219/137 R, 137.7
See application file for complete search history.

(56) References Cited

U.S. PATENT DOCUMENTS 5,534,705 A * 7/1996 Terawaki et al. ......... 250/559.29
6,321,139 B1 * 11/2001 Terada et al. ................. 700/248
(Continued)

FOREIGN PATENT DOCUMENTS

| CN | 1421293 A | 6/2003 |
|---|---|---|
| CN | 1439474 A | 9/2003 |

(Continued)

OTHER PUBLICATIONS

Office Action from Japanese Patent Office issued in corresponding Japanese Application No. 2009-031216, dated Jul. 2, 2013, 3 pages in Japanese and 3 pages in its English translation.

(Continued)

*Primary Examiner* — Mark Paschall
(74) *Attorney, Agent, or Firm* — Juan Carlos A. Marquez; Morris, Manning & Martin, LLP

(57) ABSTRACT

A welding line can be rapidly extracted using three-dimensional CAD data constituted of a large number of line sections containing welding line candidates. The method of choosing a welding line includes: a step (S110) of specifying one face (first face constituting a reference face) from two faces of a member where a welding line is to be formed; a step (S120) of specifying the other face (second face constituting a groove face) from the two faces of the number where a welding line is to be formed; a step (S130) of extracting an edge line; a step (S140) of selecting an edge line zone where welding is possible; a step (S150) of creating welding line information by unifying edge lines where welding is possible; and a step (S160) of correcting welding line information in accordance with the groove shape.

2 Claims, 9 Drawing Sheets

(56) References Cited

U.S. PATENT DOCUMENTS

2003/0108234 A1    6/2003    Fujita et al.
2004/0267400 A1*  12/2004  Ohmori et al. ................ 700/182
2009/0271156 A1*  10/2009  Kageura ........................... 703/1

FOREIGN PATENT DOCUMENTS

| JP | 06-031450 | 2/1994 |
|----|-----------|--------|
| JP | 06-059713 | 3/1994 |
| JP | 11-291039 | 10/1999 |
| JP | 11-347733 | 12/1999 |
| JP | 2000-190264 | 7/2000 |
| JP | 3165249 (B2) | 5/2001 |
| JP | 3190737 B2 | 7/2001 |
| JP | 2002-045965 | 2/2002 |
| JP | 2002-137061 A | 5/2002 |
| JP | 3354870 (B2) | 12/2002 |
| JP | 2004-1226 A | 1/2004 |
| JP | 3554832 (B2) | 8/2004 |

OTHER PUBLICATIONS

Office Action from the People's Republic of China of Chinese Application No. 201080007602.X, issued Jul. 30, 2013, pp. 1-6 in Chinese and pp. 1-3 in its English translation.

International Search Report issued by the Japanese Patent Office on May 25, 2010, in International Application No. PCT/JP2010/052088 (2 pages).

International Search Report in the corresponding PCT application PCT/JP2010/052088, mailed May 25, 2010.

Office Action, issued from the Japanese Patent Office, in corresponding Japanese Application No. 2009-031216, dated Oct. 9, 2012, 4 pages in Japanese, and 4 pages in its English translation.

* cited by examiner (A)

(B)

(C)

(A)

(B)

WELDING-LINE SELECTING METHOD

TECHNICAL FIELD

The present invention relates to a welding-line selecting method of selecting a welding line for welding performed by a welding robot on the basis of a workpiece figure contained in three-dimensional CAD data displayed on a display screen.

BACKGROUND ART

In the past, there has been developed a technique of selecting a welding line by displaying on a display screen three-dimensional CAD data input to a computer and allowing an operator to assign a welding line, where welding is to be performed, using graphic data of a workpiece. Such a welding-line selecting method is employed in an offline teaching system that prepares an operating path of a welding robot and teaches the desired operation to the robot.

With the welding-line selecting method described above, however, as illustrated in FIG. 10, a workpiece figure displayed on a display screen may include multiple welding lines and unrelated lines, and the curved parts are approximated by many short straight lines. Therefore, there is a problem in that accurately selecting only necessary welding lines from the multiple lines while looking at the workpiece figure displayed on the display screen is troublesome, and wrong lines may be selected.

To solve such a problem, PTL 1, PTL 2, etc. disclose methods for extracting edge lines at the contacting parts of members as a welding line. PTL 3, PTL 4, etc. disclose methods of extracting a welding line from contact parts in a virtual assembly and welding line candidates by assigned the welding line candidates in advance in a three-dimensional system.

CITATION LIST

Patent Literature

PTL 1: Japanese Patent No. 3165249
PTL 2: Japanese Unexamined Patent Application Publication No. 11-291039
PTL 3: Japanese Patent No. 3554832
PTL 4: Japanese Patent No. 3354870

SUMMARY OF INVENTION

Technical Problem

With the techniques disclosed in these patent literatures, however, an operator must select the welding line to be taught to the robot from the plurality of welding line candidates; therefore, the trouble of accurately selecting only the welding lines to be taught from the multiple welding line candidates is not solved. In PTL 3 and PTL 4, operation for setting the welding line candidates in CAD in advance is required, and this setting operation is also troublesome and inefficient.

The present invention has been conceived in light of the problem described above, and it is an object to provide a welding-line selecting method enabling an operator to quickly prepare a welding line for operation.

Solution to Problem

To achieve the object described above, the present invention provides the following solutions.

A welding-line selecting method of automatically selecting a welding line for a welding robot performing welding on the basis of a workpiece figure in three-dimensional CAD data displayed on a display screen, the method includes a first-face-group selecting step of selecting at least one first face among two faces constituting the work figure on which a welding groove is formed and assigning the selected first face to a first face group; a second-face-group selecting step of selecting at least one second face among two faces on which a welding groove is formed and assigning the selected second face to a second face group; an edge-line extracting step of extracting all edge lines having vertices having distances to the corresponding faces in the first face group among the edge lines of the faces selected from the second face group in the second-face-group selecting step is smaller than or equal to a predetermined value; a weldable-edge-line extracting step of selecting edge lines existing in a region weldable by the welding robot among the edge lines extracted in the edge-line extracting step on the basis of the directions of the normal vectors of the faces in the first face group and the faces in the second face group; a weldable-edge-line adding step of calculating an intersection of an edge line crossing the border of faces among the edge lines selected in the weldable-edge-line extracting step, and further selecting a weldable edge line on the basis of information about the intersection; and an integrating step of integrating the edge lines selected in the weldable-edge-line extracting step and the weldable-edge-line adding step into a continuous welding line.

Furthermore, it is preferable that there further be provided an edge-line displacing step of displacing a position of the edge line in accordance with at least one of the position and distance relative to the first face group and second face group among the edge lines extracted in the edge-line extracting step for an edge line not contacting a face in the first face group.

Advantageous Effects of Invention

According to the present invention, since only welding lines to be processed can be accurately selected from many welding line candidates, an operator can quickly prepare a welding line to be operated.

DESCRIPTION OF EMBODIMENTS

An embodiment of the present invention will be described with reference to the drawings. In the description below, same components will be represented by the same reference number. Such components have the same name and function. Thus, detailed descriptions thereof will not be repeated.

The configuration of a robot system 1 according to this embodiment will be described, in outline, with reference to FIG. 1.

Figure 1:
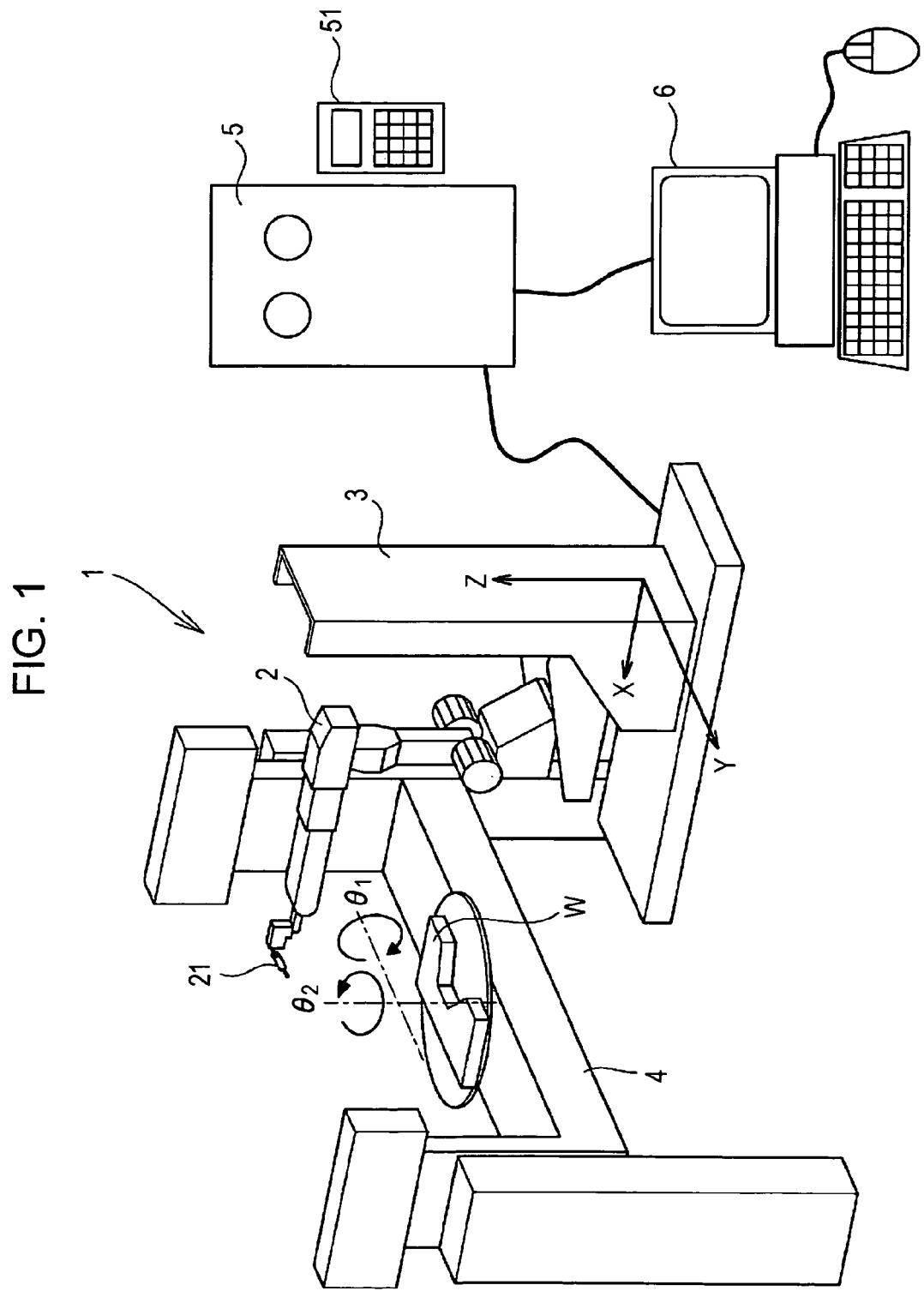
FIG. 1 illustrates, in outline, the configuration of a robot system according to an embodiment of the present invention.
Figure 2:
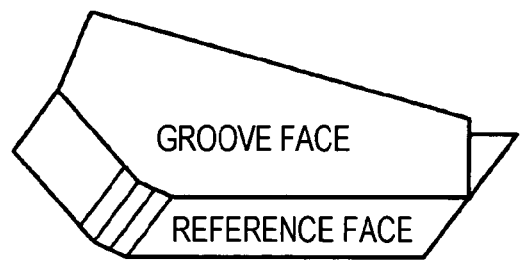
FIGS. 2(A) to 2(C) are perspective views of examples of a reference face group and a groove face group.
Figure 2:
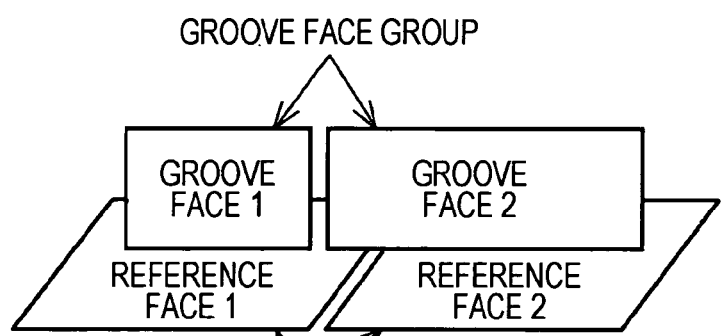
Figure 2:
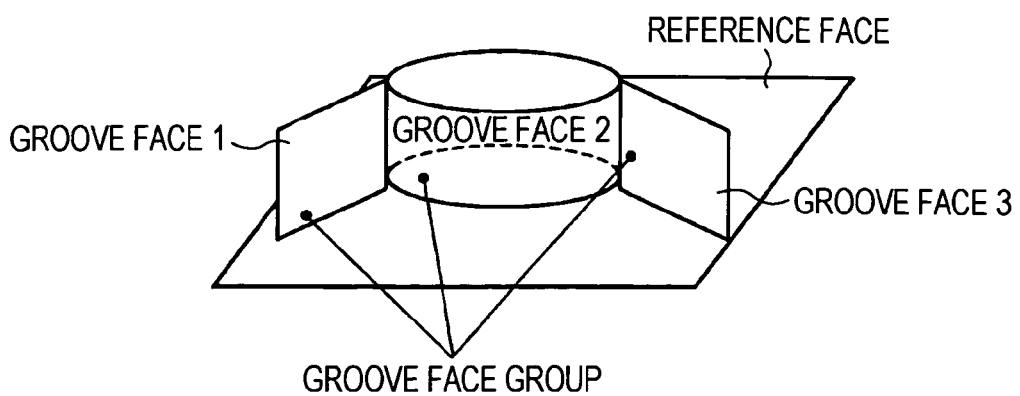

As illustrated in FIG. 1, the robot system 1 includes a vertically articulated six-axis welding robot 2, a slider 3 that moves the welding robot 2 itself, a positioner 4 that holds a workpiece W in such a manner that the orientation is changeable, a control device 5 including a teaching pendant 51, and a personal computer 6.

The welding robot 2 is a vertically articulated six-axis industrial robot, and a welding torch 21 is disposed at the tip of the welding robot 2.

The control device 5 controls the welding robot 2, the slider 3, and the positioner 4 in accordance with a teaching program 300 prepared in advance. The teaching program 300 may be prepared using the teaching pendant 51 connected to the control device 5 or may be prepared using an offline teaching system using the personal computer 6. In either case, the teaching program 300 is prepared in advance before the actual operation. The teaching program 300 prepared by the personal computer 6 is sent to the control device 5 via a medium, etc. in which data is magnetically stored or transferred to the control device 5 by data communication.

The personal computer 6, i.e., the offline teaching system includes a display capable of displaying graphics as a display device and a keyboard and a mouse as an input device. The offline teaching system has a magnetic storage device or a communication device for taking in CAD information of the workpiece W.

The present invention is related to a welding-line selecting method of automatically selecting a "welding line," where welding is to be performed by the welding robot 2, on the basis of a workpiece figure in the three-dimensional CAD data displayed on the display screen. The welding line selection is performed by the personal computer 6, which constitutes the offline teaching system.

The process of welding line selection will be described below.

As illustrated in FIGS. 2A to 2C, and 3, a welding line is set near a line of intersection of two continuous faces or two faces of different members that are equivalent to continuous faces.

In the robot system 1 according to this embodiment, by performing the following Steps 1 to 7, a welding line, where welding is to be performed by a welding robot, can be automatically selected on the basis of a workpiece figure in three-dimensional CAD data displayed on the display screen.

Step 1 (first-face-group selecting step): among two faces constituting the workpiece W on which a welding groove is formed, at least one first face (reference face) is selected, and the selected first face is assigned to a first face group (reference face group).

Step 2 (second-face-group selecting step): among two faces of the workpiece W on which a welding groove is formed, at least one second face (groove face) is selected, and the selected second face is assigned to a second face group (groove face group).

Step 3 (edge-line extracting step): in association with the edge lines (outlines defining the faces or edge lines of the faces) of the faces selected in Step 2 (second-face-group selecting step), all edge lines having vertices, whose distances to the corresponding faces in the reference face group are zero or substantially zero (which is a value that can be set appropriately in accordance with the object to be welded), are extracted.

Step 4 (weldable-edge-line extracting step): among the edge lines extracted in Step 3 (edge-line extracting step), edge lines existing in a region weldable by a welding robot are selected on the basis of the directions of the normal vectors of the faces in the reference face group and groove face group.

Step 5 (weldable-edge-line adding step): among the edge lines selected in Step 4 (weldable-edge-line extracting step), the intersection of an edge line that crosses the border of faces is calculated, and a weldable edge line is further selected on the basis of information about the intersection.

Step 6 (integrating step): the edge lines selected in Step 4 (weldable-edge-line extracting step) and Step 5 (weldable-edge-line adding step) are integrated into a continuous welding line to prepare a welding line.

Step 7 (edge-line displacing step): among the edge lines extracted in Step 3 (edge-line extracting step), for an edge line that does not contact a face in the reference face group, the position of the edge line is displaced in accordance with the position and/or distance relative to the reference face group and groove face group.

As illustrated in FIG. 4(A), when a groove face and a reference face are disposed at a substantially 90 degree angle with the groove face not joining the reference face and forming a gap therebetween, the welding line extracted through the process of Steps 1 to 5 is an edge line on the groove face side, and a gap is formed with the reference face. When this gap is small, a new welding line is set by projecting the extracted welding line (edge line on the groove face side) to the reference face in Step 7 (edge-line displacing step). When the gap is large, the midline of the gap is set as a new welding line in Step 7 (edge-line displacing step).

As illustrated in FIG. 4(B), when the groove face and the reference face are disposed substantially parallel to each other with the groove face not joining the reference face and forming a gap therebetween, the midline of the gap is set as a new welding line in Step 7 (edge-line displacing step).

Figure 5:
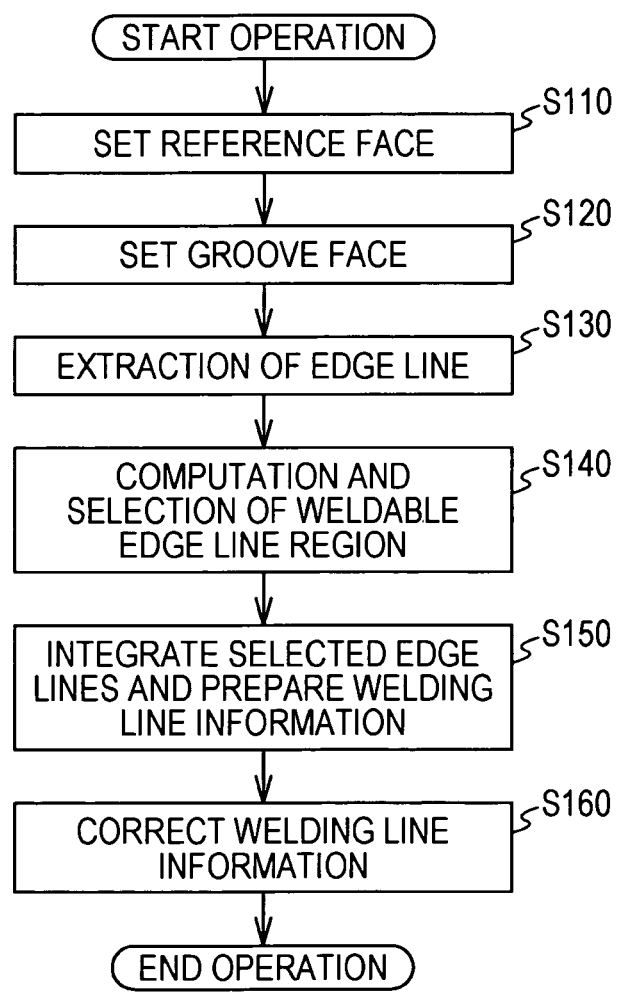
FIG. 5 is a flow chart illustrating a welding line selection process.
Figure 6:
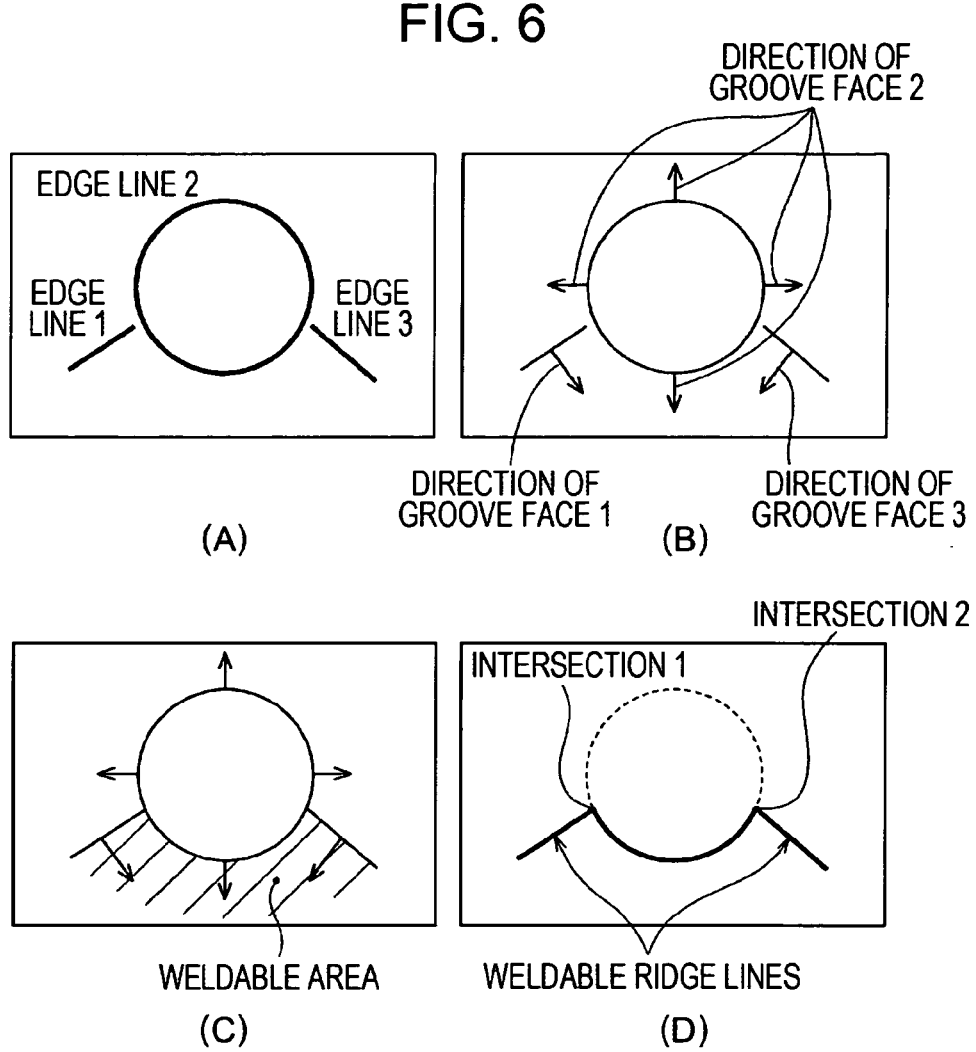
FIGS. 6(A) to 6(D) illustrate the welding line selection process in sequence.

FIG. 5 illustrates the welding line selection described above as a flow chart, and FIG. 6 are diagrams illustrating the welding line selection.

In welding line selection, first, in Step S110 in FIG. 5, a face of a member to be a reference face is assigned. When the reference face extends across a plurality of members, a plurality of reference faces is assigned. Depending on the three-dimensional CAD data, since a curved face may be approximated by a collection of polygons (polygon approximation), when a plane of the same member adjoining the assigned plane is determined to be a continuous face, these faces are also automatically selected. The selected plurality of faces is stored as the reference face group.

Next, in S120, the second face or second faces, if applicable, of the two faces on which the welding line is formed is assigned in a similar manner as in S110 and stored the groove face group.

In S130, the distances between every two vertex defining the edge line of faces in the groove face group and every face in the reference face group are calculated, and all edge lines having vertices of which the distance is zero or substantially zero are extracted.

Figure 3:
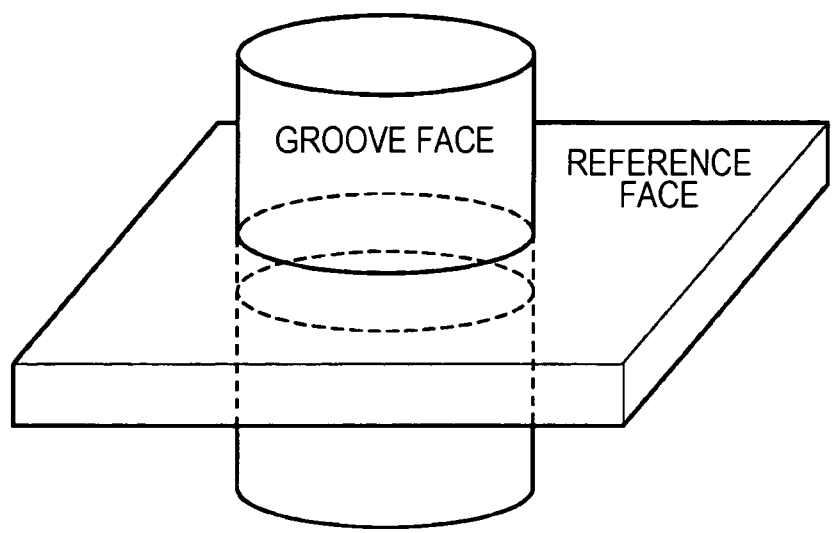
FIG. 3 is a perspective view of a reference face group and a groove face group (where the groove face penetrates the reference face).

If none of the edge lines are extracted, the cylindrical member may be penetrating a flat plane, such as illustrated in FIG. 3, and thus, an edge line of the reference-face group side may be forming the welding line. In such a case, an edge line is extracted by switching the reference face group and the groove face group. That is, the distances between every two vertices of the edge line of the faces in the groove face group and the reference face group are calculated, and all edge lines having vertices of which the distance is zero or substantially zero are extracted.

Furthermore, in S140, normal vectors perpendicular to the faces in the reference face group and the groove face group are determined. Base of the directions of the normal vectors, all edge lines existing in a region weldable by the welding robot 2 are selected from the edge lines extracted in S130. When an edge line exists across a weldable region and an unweldable region, by calculating the intersection of the edge line and the regions and dividing the edge line at the determined intersection, only the edge line in the weldable region is selected.

For example, when edge lines, such as those illustrated in FIG. 6(A), are extracted, the direction of the groove face 1 (normal direction of the groove face 1), the directions of the groove face 2 (normal directions of the groove face 2), and the direction of the groove face 3 (normal direction of the groove face 3) are calculated, as illustrated in FIG. 6(B).

As illustrated in FIG. 6(C), the side on which the normal vectors of the groove faces 1, 2, and 3 intersect is determined as a weldable area, and the opposite side is determined as an unweldable area. As illustrated in FIG. 6(D), the edge lines in the weldable area are separated as weldable edge lines.

Figure 7:
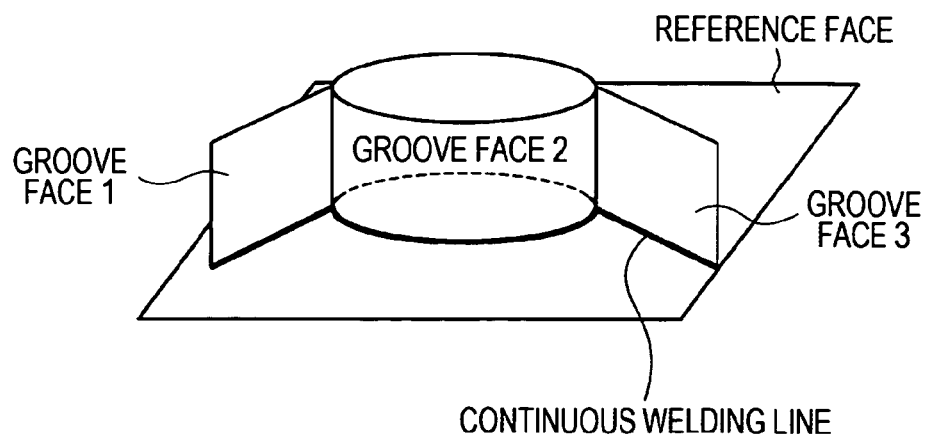
FIG. 7 illustrates an extracted welding line (weldable welding line).

Furthermore, for all of the weldable edge lines selected in S140, among the combinations (four combinations) of the two vertices of an edge line and the two vertices of another edge line, if any one of the combinations is at a distance of zero or smaller than a value that can be considered near zero, the edge lines are integrated into a continuous welding line in S150. When such a combination does not exist, the position of the intersection of extended or shorted edge lines is calculated, and the vertices of the edge lines are moved to the intersection. As a result of such process, edge lines that have been extracted but cannot be welded are removed, and a continuous welding line can be defined as illustrated in FIG. 7.

Figure 4:
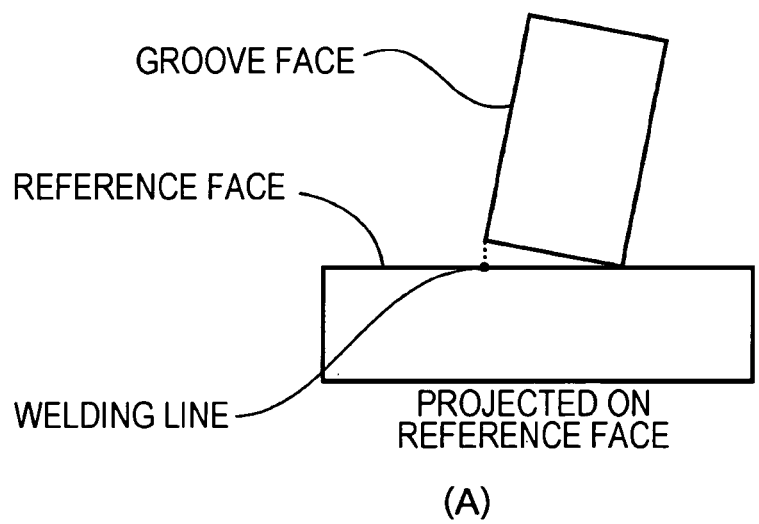
FIGS. 4(A) and 4(B) illustrate an edge-line displacement step (candidate of welding line position).
Figure 4:
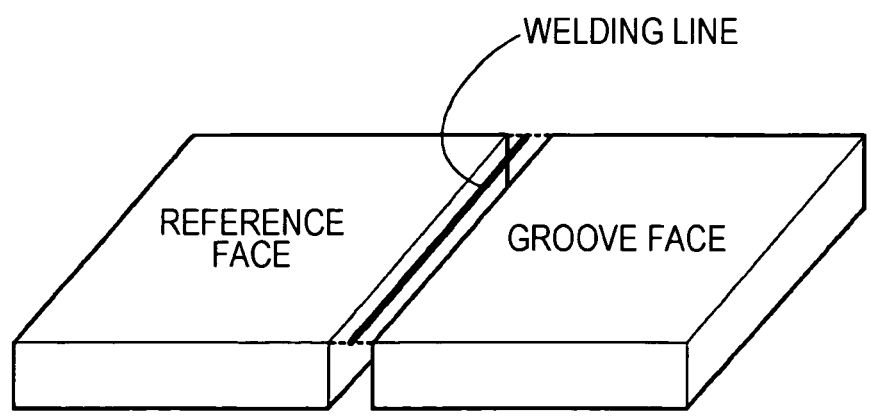

The welding line information generated in S150 is corrected in S160 as described with reference to FIG. 4.

The condition of the workpiece W displayed on the display while actually performing the above-described welding line selection will be described below.

Figure 8:
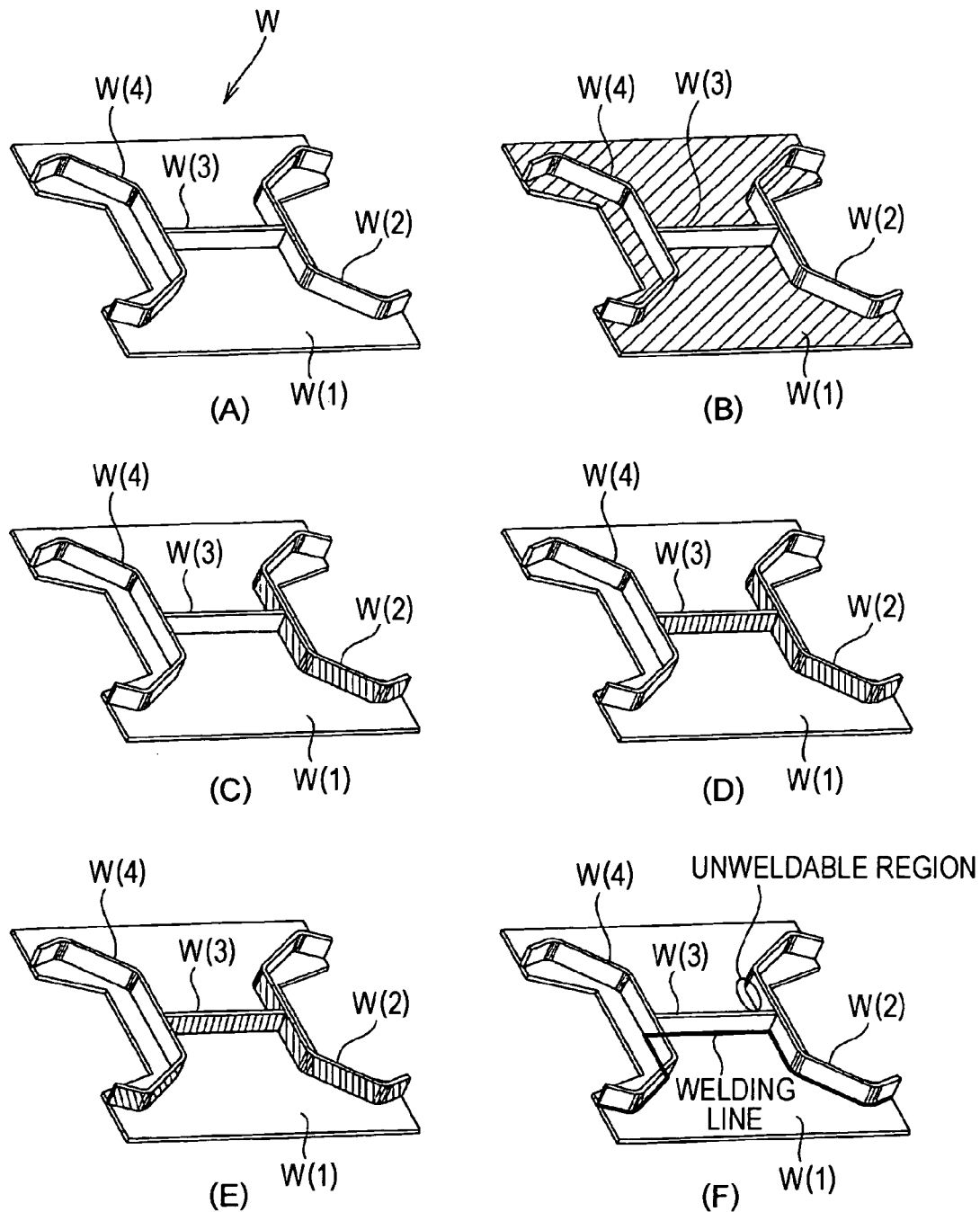
FIGS. 8(A) to 8(F) illustrate the display modes of a workpiece on a display in sequence during welding line selection.

FIG. 8 illustrates the display mode of the workpiece W displayed on the display. As illustrated by the wire frames in FIG. 8(A), the workpiece W includes a flat workpiece W(1), a substantially u-shaped workpiece W(2), a workpiece W(4), which is symmetric to the workpiece W(2), and a workpiece W(3) connecting the workpieces W(2) and W(4). In the description below, the workpieces W(2), W(3), and W(4) are integrated into one.

Figure 10:
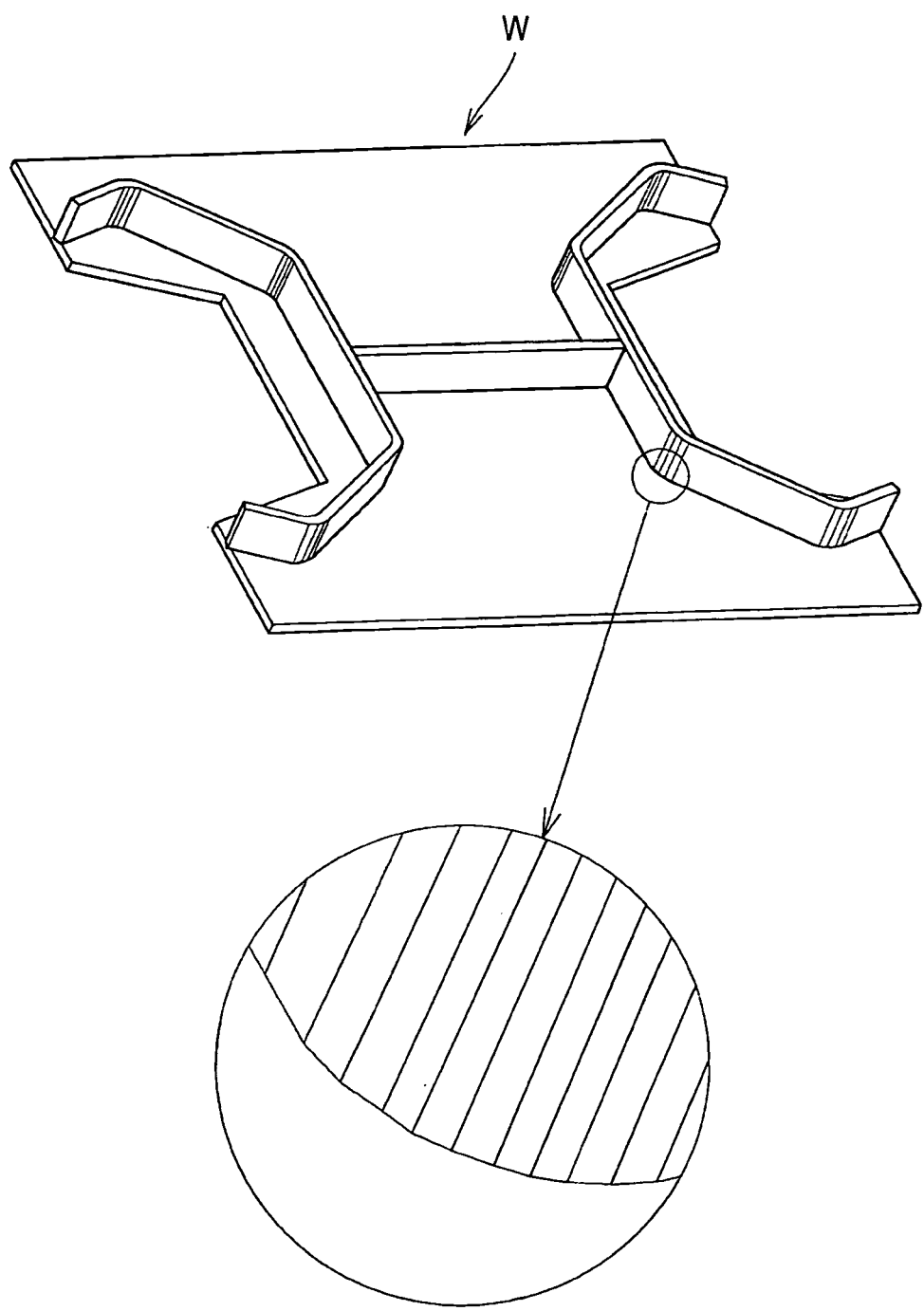
FIG. 10 illustrates an example workpiece figure displayed on a display screen.

In the wire frame of the workpiece W, which is illustrated in FIG. 8(A), curved planes are approximated by a plurality of line segments, as illustrated in FIG. 10. To select a welding line for the workpiece W on the wire frame, many line segment's must be selected one by one, which is an extremely time consuming process.

In a welding-line preparing procedure, first, a reference face is assigned (S110). At this time, when the workpiece W(1) is assigned as the reference face (for example, the mouse is operated to move a pointer onto the workpiece W(1), and then the mouse button is clicked), the display mode of the workpiece W(1) changes, as illustrated in FIG. 8(B) (in FIG. 8(B), the workpiece W(1) is hatched, but when a color display is used, the color changes).

Next, a second face, which is not a reference face, is assigned (S120). If necessary, multiple faces are assigned at this time. When workpiece W(2) is assigned as a second face (for example, the mouse is operated to move a pointer onto the workpiece W(2), and then the mouse button is clicked), the display mode (color) of the workpiece W(2) changes, as illustrated in FIG. 8(C).

Furthermore, when the workpiece W(3) is assigned as a second face (for example, the mouse is operated to move a pointer onto the workpiece W(3), and then the mouse button is clicked), the display mode (color) of the workpiece W(3) changes, as illustrated in FIG. 8(D).

Furthermore, when the workpiece W(4) is assigned as a second face (for example, the mouse is operated to move a pointer onto the workpiece W(4), and then the mouse button is clicked), the display mode (color) of the workpiece W(4) changes, as illustrated in FIG. 8(E).

Edge lines are extracted (S130); a weldable edge region is computed and selected (S140); and the selected edge lines are integrated into a welding line (S150). In this way, a continuous welding line is displayed, as illustrated in FIG. 8(F).

As illustrated in FIG. 8(F), a welding line is not prepared in the unweldable region (region in which the normal vectors do not intersect) between the workpiece W(1) and the other workpieces (workpieces W(2), W(3), and W(4)).

By simply assigning the reference faces and the groove faces on which a welding line is to be set, a continuous welding line can be assigned efficiently. Even when there is a gap, a practical welding target position can be set, improving the welding quality. That is, the operation load borne by the operator preparing an operating path for a welding robot can be reduced, and welding line selection having significantly improved operation efficiency can be provided.

Figure 9:
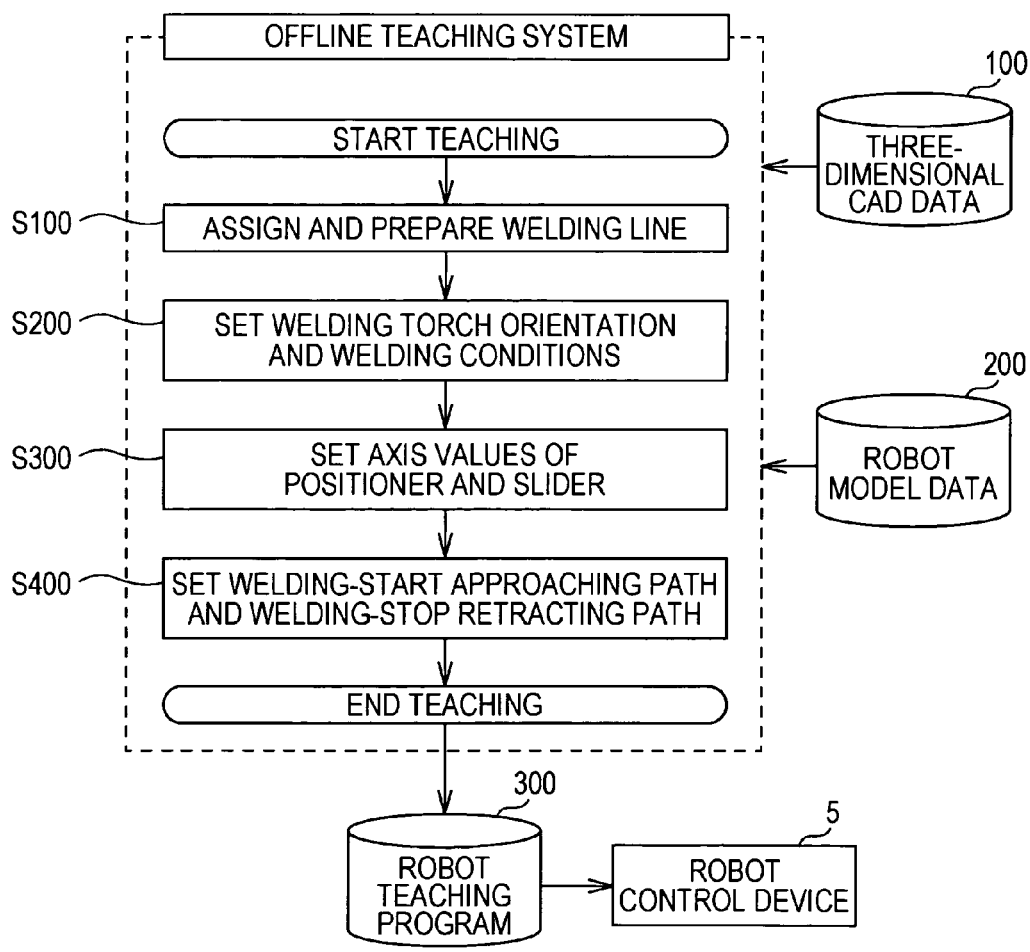
FIG. 9 is a flow chart illustrating welding teaching operation.

Next, welding teaching operation (teaching operation) will be described below with reference to FIG. 9.

In preparation of the operation, three-dimensional CAD data 100 of the workpiece to be processed and robot model data 200 defining the three-dimensional form and the mechanisms of the robot, the positioner, and the slider are installed to the offline teaching system in advance are read in advance.

First, in S100, the welding line selection described in this embodiment is performed to assign the positions of the welding lines and to prepare welding-line information.

In S200, the welding conditions of the welding lines and welding torch orientation are set. In S300, the positions of the slider 3 and the positioner 4 are set, if required, to set the robot in the operating range without interference. In S400, the approaching path at the start of welding and the retracting path at the end of welding are set.

By performing such process of S100 to S400, the welding teaching operation (teaching operation) is completed. Finally, the teaching program (robot teaching program) 300 that realizes operation of an actual apparatus is output. The robot teaching program 300 is sent to the control device 5 via a medium, etc. in which data is magnetically stored or transferred to the control device 5 by data communication.

The embodiment displayed above is merely an example and should be considered as not limiting. The present invention is not defined by the above description but by the claims and intends to include various modifications equal to the concept of the claims and within the scope of the present invention.

For example, an offline teaching system for a welding robot is described above as an example in the embodiment. The present invention, however, may also be applied to welding line assignment of an automatic welding apparatus.

The present invention is based on Japanese Patent Application No. 2009-031216 filed in the Japan Patent Office on Feb. 13, 2009, the entire contents of which are incorporated herein by reference.

REFERENCE SIGNS LIST

1 robot system
2 welding robot
3 slider
4 positioner
5 control device
6 personal computer

The invention claimed is:

1. A welding-line selecting method of automatically selecting a welding line for a welding robot performing welding on the basis of a workpiece figure in three-dimensional CAD data displayed on a display screen, wherein the workpiece figure is defined by a first-face-group and a second-face-group, the first-face-group including data on at least one first face which represents a first plane surface of the workpiece, and the second-face-group including data on at least one second face which represents a second plane surface of the workpiece, the method comprising:

a first-face-group selecting step of selecting at least one first face representative of the workpiece figure and assigning the selected first face to the first face group;

a second-face-group selecting step of selecting at least one second face representative of the workpiece figure and assigning the selected second face to the second face group;

an edge-line extracting step of extracting all edge lines having vertices with distances to the corresponding faces in the first face group among the edge lines of the faces selected from the second face group that are smaller than or equal to a predetermined value;

a weldable-edge-line extracting step of selecting edge lines existing in a region weldable by the welding robot among the edge lines extracted in the edge-line extracting step on the basis of the directions of the normal vectors of the faces in the first face group and the faces in the second face group;

a weldable-edge-line adding step of calculating an intersection between the faces in the first-face-group and the corresponding faces in the second-face-group based on the edge lines selected in the weldable-edge-line extracting step, and further selecting a weldable edge line on the basis of information about the intersection; and an integrating step of integrating the edge lines selected in the weldable-edge-line extracting step and the weldable-edge-line adding step into a continuous welding line.

2. The welding-line selecting method according to claim 1, further comprising:

an edge-line displacing step of displacing a position of the edge line in accordance with at least one of the position and distance relative to the first face group and second face group among the edge lines extracted in the edge-line extracting step for an edge line not contacting a face in the first face group.

* * * * *